(12) United States Patent
Jones et al.

(10) Patent No.: US 11,807,318 B2
(45) Date of Patent: Nov. 7, 2023

(54) TRACK PAD WITH UNIFORM HARDENED REGION

(71) Applicant: Caterpillar Inc., Peoria, IL (US)

(72) Inventors: Benjamin Jones, Bartonville, IL (US); Scott H. Magner, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 249 days.

(21) Appl. No.: 16/949,593

(22) Filed: Nov. 5, 2020

(65) Prior Publication Data

US 2022/0135156 A1    May 5, 2022

(51) Int. Cl.
| | |
|---|---|
| *B62D 55/20* | (2006.01) |
| *B62D 55/21* | (2006.01) |
| *C21D 1/10* | (2006.01) |
| *C21D 1/18* | (2006.01) |
| *C21D 9/00* | (2006.01) |

(52) U.S. Cl.
CPC ............ *B62D 55/202* (2013.01); *B62D 55/21* (2013.01); *C21D 1/10* (2013.01); *C21D 1/18* (2013.01); *C21D 9/0068* (2013.01); *B62D 55/20* (2013.01)

(58) Field of Classification Search
CPC ....... B62D 55/20; B62D 55/202; B62D 55/21
See application file for complete search history.

(56) References Cited

U.S. PATENT DOCUMENTS

| | | | |
|---|---|---|---|
| 2,549,930 A | | 4/1951 | Riegel et al. |
| 3,237,999 A | * | 3/1966 | Pentecost ............... B62D 55/20 |
| | | | 29/891.1 |
| 3,955,855 A | | 5/1976 | Massieon et al. |
| 4,139,240 A | * | 2/1979 | Profio ................... B62D 55/062 |
| | | | 29/891.1 |
| 5,598,896 A | | 2/1997 | Haest |
| 5,759,309 A | * | 6/1998 | Watts ...................... C21D 1/667 |
| | | | 148/714 |
| 8,684,475 B2 | | 4/2014 | Wodrich et al. |
| 8,905,493 B2 | | 12/2014 | Liu |
| 9,290,217 B2 | | 3/2016 | Steiner |
| 9,409,613 B2 | | 8/2016 | Hakes |
| 9,719,158 B2 | | 8/2017 | Westoby et al. |
| 2003/0230069 A1 | * | 12/2003 | Okawa ................... B62D 55/32 |
| | | | 59/35.1 |
| 2006/0043791 A1 | * | 3/2006 | Sho ......................... B62D 55/21 |
| | | | 305/198 |
| 2006/0181151 A1 | * | 8/2006 | Wodrich ................. B62D 55/21 |
| | | | 305/201 |
| 2014/0083782 A1 | * | 3/2014 | Brewer ................. B62D 55/202 |
| | | | 180/9.1 |

(Continued)

FOREIGN PATENT DOCUMENTS

WO    2007108486    9/2007

*Primary Examiner* — Kip T Kotter

(57) ABSTRACT

A track pad may include a base member and a roller path member extending from the base member. The roller path member may include a roller path surface for engaging with a roller of a machine. The roller path member may include a leading side and a trailing side in a direction of travel of the machine. The roller path member may include a hardened region that extends from the roller path surface and a body region adjacent the hardened region. The hardened region may have a greater hardness than the body region. The hardened region may have a uniform depth from the leading side to the trailing side of the roller path member.

20 Claims, 4 Drawing Sheets

(56) References Cited

U.S. PATENT DOCUMENTS

| | | | |
|---|---|---|---|
| 2015/0375813 A1* | 12/2015 | Talbot | C22C 38/46 |
| | | | 305/198 |
| 2016/0194039 A1* | 7/2016 | Fitzgibbons, Jr. | B62D 55/21 |
| | | | 305/201 |
| 2017/0275717 A1 | 9/2017 | Saad et al. | |
| 2018/0215425 A1 | 8/2018 | Roske et al. | |
| 2019/0351958 A1* | 11/2019 | Hakes | B62D 55/21 |

* cited by examiner

TRACK PAD WITH UNIFORM HARDENED REGION

TECHNICAL FIELD

The present disclosure relates generally to track pads for a tracked machine and, for example, to track pads with a uniform hardened region.

BACKGROUND

A machine, such as an earthmoving machine, may be moveable via use of a track (e.g., a crawler track, a continuous track, or the like). A track may include a loop of multiple track pads (e.g., crawler shoes) interlocked with each other via use of a pin and pin-bore system. A track pad may have various wear surfaces, such as a ground engaging surface that engages a traveling surface of the machine and/or a roller engaging surface that contacts various rollers associated with the track (e.g., load rollers, carrier rollers, idlers, and/or the like). With regard to a roller engaging surface, contact between the roller engaging surface and a set of rollers associated with the machine may cause the track pad to experience significant wear on the roller engaging surface. To reduce wear, the track pad may undergo an induction hardening process to harden the roller engaging surface. However, the induction hardening process may produce a hardened region that does not extend uniformly in depth. As a result, the roller engaging surface may wear unevenly, thereby reducing a useful life of the track pad.

U.S. Patent Application Publication No. 2017/0275717 (the '717 publication) discloses a crawler track shoe. The '717 publication indicates that the roller path surface of the track shoe and an immediate underlying metal portion are pre-hardened by placing an explosive charge on the surface of the track shoe, and detonating the explosive charge to impart a high force on the surface and underlying metal portion for a short duration. The '717 publication states that this increases the hardness and the strength of the surface and underlying metal portion.

While the track shoe of the '717 publication has a hardened surface, the '717 publication does not indicate that the hardened surface extends uniformly in depth. Moreover, the explosive hardening process employed by the '717 publication is difficult to manage, relative to an induction hardening process, and therefore unsuitable for producing a uniform hardened region of the track shoe with the necessary precision and reliability. Furthermore, the usefulness of the explosive hardening process employed by the '717 publication is limited to track shoes cast from materials with low initial hardness, such as manganese steel, and cannot be used for track shoes cast from other harder materials such as medium or high carbon steels.

The track pad of the present disclosure solves one or more of the problems set forth above and/or other problems in the art.

SUMMARY

A track pad may include a base member and a roller path member extending from the base member, the roller path member including a roller path surface for engaging with a roller of a machine, the roller path member including a leading side and a trailing side in a direction of travel of the machine, and the roller path member including a hardened region that extends from the roller path surface and a body region adjacent the hardened region, where the hardened region has a greater hardness than the body region, and where the hardened region has a uniform depth from the leading side to the trailing side of the roller path member.

A method may include positioning a first thermal transfer regulation element at a leading side, and a second thermal transfer regulation element at a trailing side, of a roller path member of a track pad, where the roller path member includes a first edge portion at the leading side, a second edge portion at the trailing side, and a middle portion between the first edge portion and the second edge portion; and performing a surface hardening process on the roller path member while the first thermal transfer regulation element is positioned at the leading side, and the second thermal transfer regulation element is positioned at the trailing side, of the roller path member, where the first edge portion and the second edge portion have a same thermal profile as the middle portion during the surface hardening process.

A track pad may be obtained by a process that includes positioning a first thermal transfer regulation element at a leading side, and a second thermal transfer regulation element at a trailing side, of a roller path member of the track pad, where the roller path member includes a first edge portion at the leading side, a second edge portion at the trailing side, and a middle portion between the first edge portion and the second edge portion; and performing a surface hardening process on the roller path member while the first thermal transfer regulation element is positioned at the leading side, and the second thermal transfer regulation element is positioned at the trailing side, of the roller path member, where the first edge portion and the second edge portion have a same thermal profile as the middle portion during the surface hardening process.

DETAILED DESCRIPTION

Figure 1:
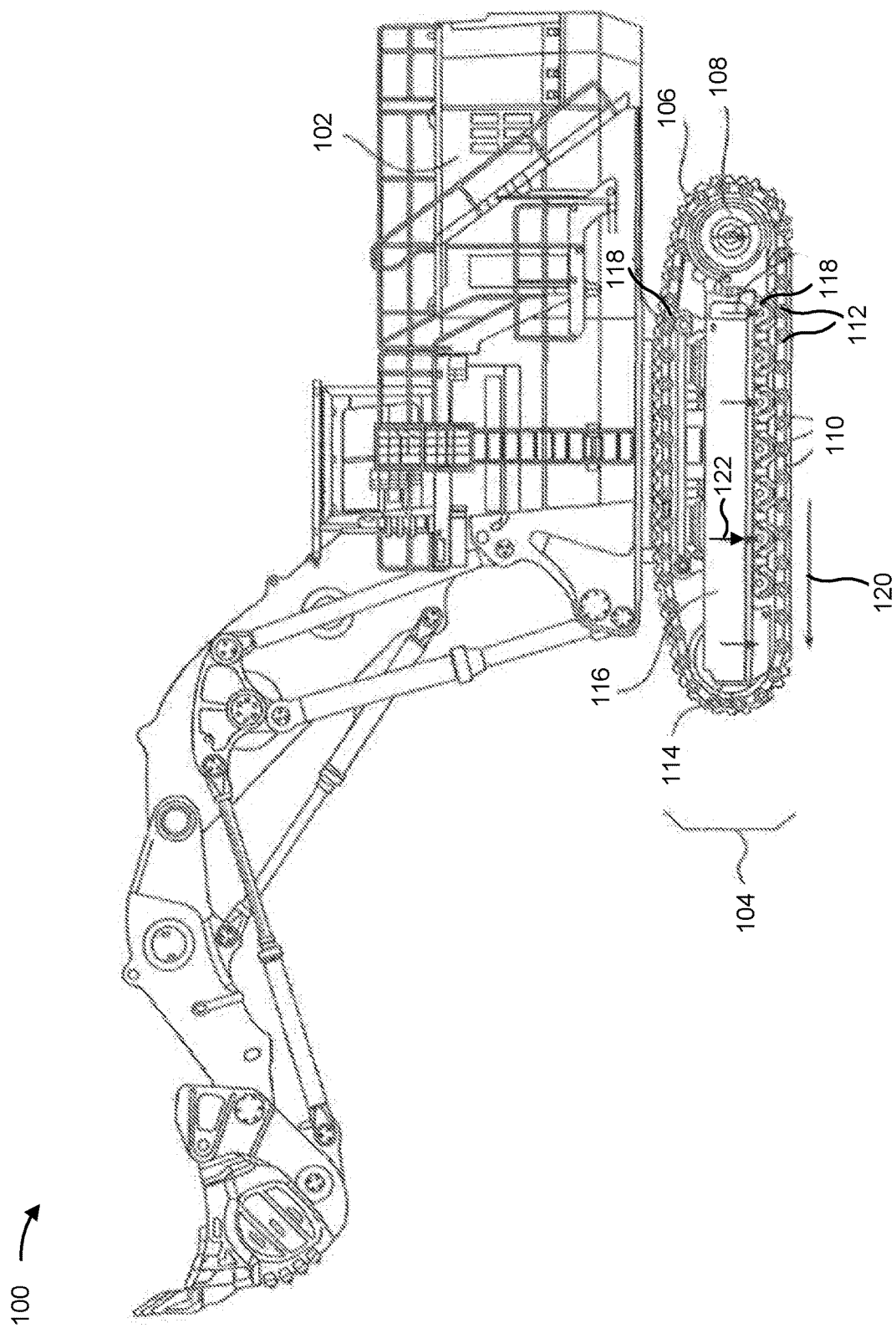
FIG. 1 shows an example track type machine.

FIG. 1 shows an example track type machine 100. For example, as shown, machine 100 may be a shovel, such as a mining shovel, a hydraulic mining shovel, or the like. However, machine 100 may be another type of machine that performs an operation associated with an industry such as, for example, mining, construction, farming, transportation, forestry, or any other industry. As some examples, machine 100 may be a vehicle, a backhoe loader, a cold planer, a wheel loader, a compactor, a feller buncher, a forest machine, a forwarder, a harvester, an excavator (e.g., a hydraulic excavator), an industrial loader, a knuckleboom loader, a material handler, a motor grader, a pipelayer, a road reclaimer, a skid steer loader, a skidder, a telehandler, a tractor, a dozer, a tractor scraper, or other paving or earthmoving equipment. Moreover, one or more implements may be connected to machine 100.

Machine 100 includes an engine 102 supported by a frame and configured to drive a tracked undercarriage 104 (e.g., a crawler track, a continuous track, or the like). Tracked undercarriage 104 includes a track 106. While only one track 106 is shown in FIG. 1, machine 100 may include a pair of tracks 106 that are located at opposing sides of machine 100.

Track 106 is driven by engine 102 via a drive wheel 108. Track 106 includes a plurality of track pads 110 connected end-to-end via pins 112 to form an endless loop. The endless loop of track pads 110 wraps around drive wheel 108, one or more idler wheels 114, and at least one roller 118. Drive wheel 108 engages pins 112 (or engages bushings that encase pins 112) of track pads 110 and thereby transmits torque from engine 102 to track 106. Idler wheel 114 and rollers 118 may guide track 106 in a generally elliptical trajectory around drive wheel 108. A tensioner 116 may be located between idler wheel 114 and drive wheel 108 to push these components apart and thereby maintain a desired tension of track 106. Track pads 110 may function to transmit the torque from drive wheel 108 as a driving linear (tractive) force 120 into a ground surface. The weight of machine 100 may be transmitted from drive wheel 108, idler wheel 114, and rollers 118 through track pads 110 as a downward bearing force 122 into the ground surface.

As indicated above, FIG. 1 is provided as an example. Other examples may differ from what was described in connection with FIG. 1.

Figure 2:
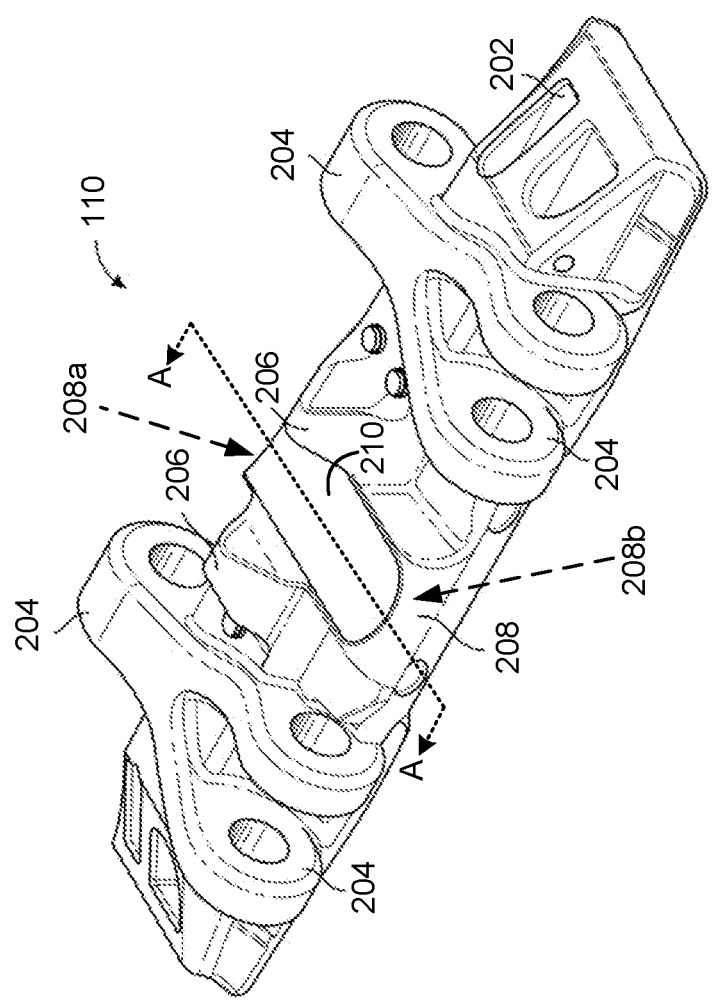
FIG. 2 shows an example track pad.

FIG. 2 shows an example track pad 110. Track pad 110 includes a base member 202. Pin lug members 204 extend from base member 202 and are configured to receive a pin in order to couple pin lug members 204 to pin lugs of another track pad. For instance, a plurality of track pads 110 may be pivotally coupled via pin lug members 204 in order to form track 106, as described above. Drive lug members 206 extend from base member 202. A roller path member 208 (e.g., a wear pad) extends from base member 202 between drive lug members 206. Roller path member 208 includes a leading side 208a (e.g., a leading lateral surface) and a trailing side 208b (e.g., a trailing lateral surface) in a direction of rotation of track 106 (e.g., along a direction of travel of machine 100).

As track 106 rotates, a roller path surface 210 (e.g., a roller engaging surface) of roller path member 208 is configured to interface (e.g., mate) with rollers 118, absorbing a machine load (e.g., force 122) from rollers 118. Drive lug members 206 include inside surfaces that are configured to interface with outer side surfaces of rollers 118 in order to guide track 106 between drive lug members 206 and into contact with roller path surface 210 of roller path member 208 as track 106 rotates. Roller path surface 210 may be a concave surface defined between drive lug members 206.

Track pad 110 may be cast in a metal or a metal alloy. For example, track pad 110 may be composed of a steel, such as a carbon steel. As an example, the carbon steel may be a low carbon steel (e.g., a carbon content of 0.04% to 0.3% by weight of the steel), a medium carbon steel (e.g., a 0.3% to 0.6% carbon content by weight of the steel), such as a 0.36% carbon steel, or a high carbon steel (e.g., at least a 0.6% carbon content by weight of the steel). The carbon steel may be an alloy steel with another metal, such as manganese (e.g., up to 1.65% manganese content by weight of the steel). In some implementations, track pad 110 is composed of a metal other than manganese steel, which is a steel alloy of at least 12% by weight manganese. In other words, track pad 110 may be composed of a carbon steel or steel alloy that includes less than 12% by weight, less than 10% by weight, less than 5% by weight, or less than 2% by weight, manganese.

As indicated above, FIG. 2 is provided as an example. Other examples may differ from what was described in connection with FIG. 2.

Figure 3:
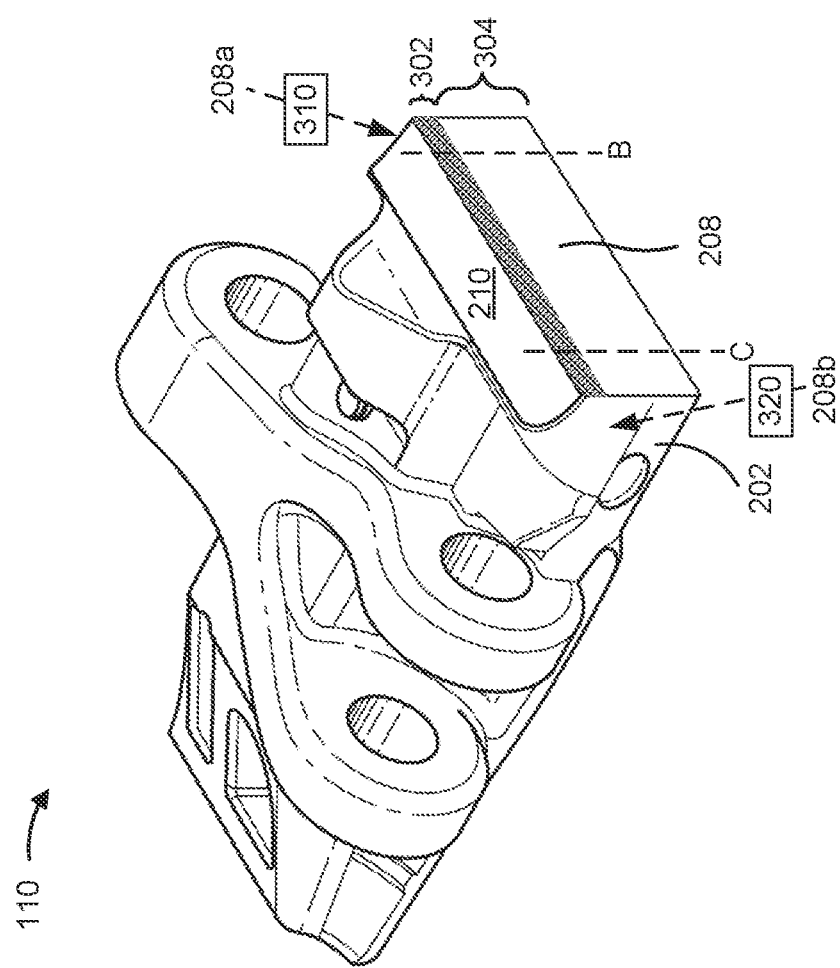
FIG. 3 shows a cross-sectional view of the track pad of FIG. 2 along line A-A.

FIG. 3 shows a cross-sectional view of track pad 110 of FIG. 2 along line A-A. As shown in FIG. 3, roller path member 208 includes a hardened region 302 and a body region 304 (e.g., an unhardened region). That is, hardened region 302 may be a surface region of roller path member 208 (e.g., extending from roller path surface 210) and body region 304 may be a remaining portion of roller path member 208. Hardened region 302 may have a greater hardness than body region 304 or a remaining portion of track pad 110. For example, hardened region 302 may have a hardness (e.g., minimum or average hardness) of at least 50 Rockwell C and body region 304 or the remaining portion of track pad 110 may have a hardness (e.g., maximum or average hardness) of less than 50 Rockwell C, such as a hardness of at most 35 Rockwell C. As an example, hardened region 302 may have a hardness (e.g., minimum or average hardness) of 50 to 55 Rockwell C and body region 304 or the remaining portion of track pad 110 may have a hardness (e.g., maximum or average hardness) of 30 to 34 Rockwell C. As another example, hardened region 302 may have a hardness that is 40% to 70% greater than a hardness of body region 304 or the remaining portion of track pad 110.

As shown in FIG. 3, hardened region 302 may extend from leading side 208a to trailing side 208b, and from roller path surface 210 towards base member 202. Body region 304 may extend from leading side 208a to trailing side 208b, and from hardened region 302 to base member 202. That is, body region 304 is adjacent hardened region 302, and hardened region 302 is a surface region of roller path member 208. Hardened region 302 may have a uniform depth (e.g., measured from roller path surface 210) from leading side 208a to trailing side 208b. For example, the depth of hardened region 302 may be uniform along a center line (e.g., line A-A) of roller path member 208 from leading side 208a to trailing side 208b. "Uniform depth" may refer to a depth of hardened region 302 that is within a tolerance, such as ±0.1%, ±1%, or ±5%. The depth of hardened region 302 (e.g., measured from roller path surface 210 and along the center line of roller path member 208) may be at least 25 millimeters, at least 27 millimeters, or at least 30 millimeters (e.g., allowing for deviations within the tolerance, as described above).

A first edge portion of hardened region 302 may be located at leading side 208a (e.g., between leading side 208a and line B, which may encompass about 1/8, 1/4, 1/3, or the like, of an overall length of roller path member 208) and a second edge portion of hardened region 302 may be located at trailing side 208b (e.g., between trailing side 208b and line C, which may encompass about 1/8, 1/4, 1/3, or the like, of the overall length of roller path member 208). A middle portion of hardened region 302 may be defined between the first and second edge portions of hardened region 302 (e.g., between lines B and C). The first and second edge portions of hardened region 302 may extend to a same depth (e.g., within the tolerance, as described above) as the middle portion of hardened region 302. That is, the entire surface region of roller path member 208 is hardened to approximately the same depth. This is in contrast to edge portions that are not hardened, relative to body region 304, or edge portions that have shallower hardening relative to the middle portion. In other words, hardened region 302 of roller path member 208 does not taper at the edge portions and maintains a constant depth (e.g., within the tolerance, as described above) from leading side 208a to trailing side 208b.

Track pad 110, and in particular hardened region 302, may be obtained by performing a surface hardening process, such as an induction hardening process, on track pad 110/roller path member 208. The surface hardening process may be performed while thermal transfer regulation elements are positioned at leading side 208a and trailing side 208b of roller path member 208, as described in greater detail below. Hardened region 302 may be obtained by performing the surface hardening process on track pad 110/roller path member 208 only a single time (e.g., performing only a single pass of the surface hardening process) and/or by using only a single set of surface hardening process parameters (e.g., electrical current, feed rate, and/or dwell time, among other examples, in the case of induction hardening) during surface hardening. In some implementations, track pad 110, and in particular hardened region 302, is obtained after performing an induction hardening process on track pad 110/roller path member 208, and without use of another surface hardening process or machine use-based hardening (e.g., hardening resulting from deformation of roller path member 208 during use of machine 100 due to a machine load).

As indicated above, FIG. 3 is provided as an example. Other examples may differ from what was described in connection with FIG. 3.

Figure 4:
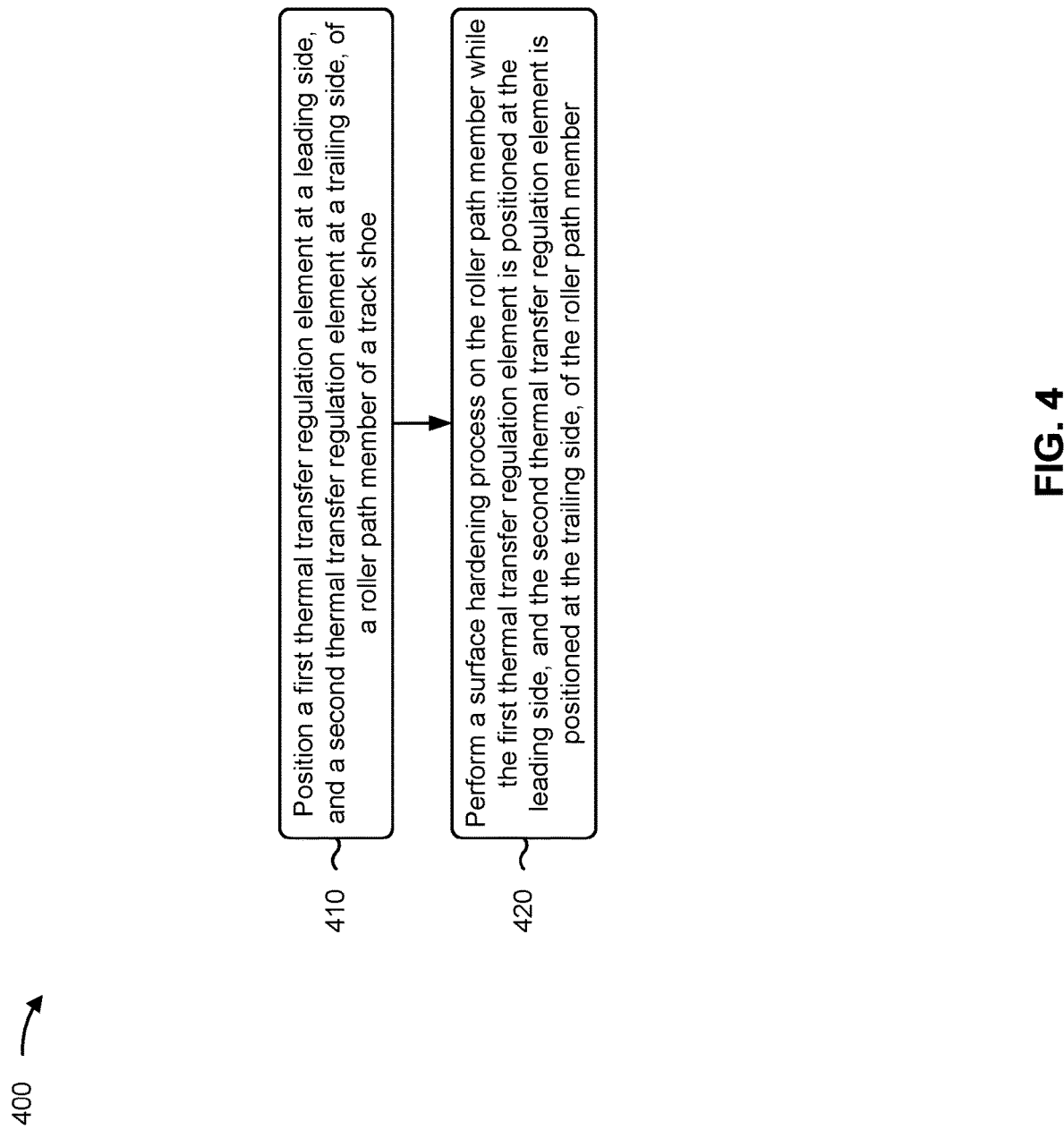
FIG. 4 is a flowchart of an example process relating to a track pad with a uniform hardened region.

FIG. 4 is a flowchart of an example process 400 associated with a track pad with a uniform hardened region. In some implementations, one or more process blocks of FIG. 4 may be performed by a machine (e.g., an automated machine or a semi-automated machine).

As shown in FIG. 4, process 400 may include positioning a first thermal transfer regulation element 310 at leading side 208a, and a second thermal transfer regulation element 320 at trailing side 208b, of roller path member 208 of track pad 110 (block 410). The roller path member 208 may include a first edge portion at the leading side 208a, a second edge portion at the trailing side 208b, and a middle portion between the first edge portion and the second edge portion, as described above. The thermal transfer regulation elements 310 and 320 may be sacrificial parts that are used to regulate a thermal profile of roller path member 208 during a surface hardening process, as described below. The thermal transfer regulation elements 310 and 320 may be composed of a material associated with a high heat capacitance (e.g., a material having a melting point from 900 to 3700 kelvin (K)). The thermal transfer regulation elements 310 and 320 may be composed of a thermal insulating material (e.g., a material having a thermal resistance, also referred to as an R-value, from 0.6 to 1.5 kelvin square-meter per watt (K·m2/W)) or a thermal conducting material (e.g., a material having a thermal conductivity, also referred to as a K-value, from 200 to 400 watts per meter-kelvin (W/m·K)). In some examples, the thermal transfer regulation elements 310 and 320 are a metal or metal alloy, such as copper. For example, the thermal transfer regulation elements 310 and 320 may be composed of a first metal or metal alloy (e.g., copper), and track pad 110 may be composed of a second metal or metal alloy (e.g., a carbon steel) different from the first metal or metal alloy. In some examples, the thermal transfer regulation elements 310 and 320 are polytetrafluoroethylene. In some examples, the thermal transfer regulation elements 310 and 320 are heat sinks.

Positioning the first thermal transfer regulation element 310 at leading side 208a and the second thermal transfer regulation element 320 at trailing side 208b may include adjoining (e.g., contacting or affixing, such as by welding) the first thermal transfer regulation element 310 to leading side 208a and adjoining the second thermal transfer regulation element 320 to trailing side 208b. A thermal transfer regulation element 310 and/or 320 may include a surface that is shaped to follow a shape of leading side 208a or trailing side 208b. In other words, the surface of the thermal transfer regulation element 310 and/or 320 may be a negative of the surface of leading side 208a or trailing side 208b, such that the thermal transfer regulation element 310 and/or 320, when positioned, fits snuggly against leading side 208a or trailing side 208b. The thermal transfer regulation elements 310 and 320, when positioned, align (e.g., at upper edges of the thermal transfer regulation elements) with roller path surface 210 and extend toward base member 202 (e.g., lower edges of the thermal transfer regulation elements 310 and 320 may align with the depth of the hardened region 302 that is to be produced). A thermal transfer regulation element 310 and/or 320 may have a thickness (e.g., measured between the surface, as described above, of the thermal transfer regulation element 310 and/or 320 and an opposite surface of the thermal transfer regulation element 310 and/or 320) of at least 20 millimeters, at least 30 millimeters, or at least 40 millimeters.

The first thermal transfer regulation element 310 and the second thermal transfer regulation element 320 may be connected. For example, the first thermal transfer regulation 310 element and the second thermal transfer regulation element 320 may be connected by a frame, such as a sleeve, a cuff, a tray, or the like, that is configured to at least partially surround track pad 110 during the surface hardening process so that the thermal transfer regulation elements 310 and 320 are positioned at leading side 208a and trailing side 208b of roller path member 208. Accordingly, positioning the first thermal transfer regulation element 310 at leading side 208a and the second thermal transfer regulation element 320 at trailing side 208b may include positioning the frame so as to at least partially surround track pad 110. In some implementations, the frame may be U-shaped (e.g., include two projecting leg elements connected by a lateral element), and the first thermal transfer regulation element 310 may be connected at a first leg of the frame and the second thermal transfer regulation element 320 may be connected at a second leg of the frame. The frame may be the same material as the thermal transfer regulation elements 310 and 320 or a different material.

As further shown in FIG. 4, process 400 may include performing a surface hardening process on roller path member 208 while the first thermal transfer regulation element 310 is positioned at leading side 208a, and the second thermal transfer regulation element 320 is positioned at trailing side 208b, of roller path member 208 (block 420). During the surface hardening process, the first edge portion and the second edge portion of roller path member 208 may have the same thermal profile as the middle portion of roller path member 208, as described below. The surface hardening process may be an induction hardening process. For example, the surface hardening process may be performed by passing an induction coil over a surface of roller path member 208 (to thereby heat the surface of roller path member 208) followed by quenching of roller path member 208. Alternatively, the surface hardening process may be another heat-based surface hardening process, such as a flame hardening process.

The surface hardening process may produce the same temperature (e.g., ±0.1%, ±1%, or ±5%) to a uniform depth from leading edge 208a to trailing edge 208b of roller path member 208. That is, the temperature produced at edge portions of roller path member 208 (e.g., between leading side 208a and line B and between trailing side 208b and line C) is the same as at the middle portion of roller path member 208 (e.g., between lines B and C). Accordingly, the surface hardening process may produce even heating of a region of roller path member 208, corresponding to hardened region 302, as a result of the thermal transfer regulation elements 310 and 320.

In particular, during the surface hardening process, a thermal profile of the middle portion of roller path member 208 may be regulated by the edge portions of roller path member 208, located at either side of the middle portion (e.g., because the edge portions are also heated during the surface hardening process). Similarly, during the surface hardening process, a thermal profile of an edge portion of roller path member 208 may be regulated by a thermal transfer regulation element 310 and/or 320 and the middle portion of roller path member 208, located at either side of the edge portion. Thus, during the surface hardening process, the edge portions of roller path member 208 and the middle portion of roller path member 208 may have the same (e.g., ±0.1%, ±1%, or ±5%) thermal profile (e.g., instantaneous temperature, rate of heat flow, rate of heat transfer, and/or convective heat loss, among other examples).

The surface hardening process (e.g., induction hardening process) may be performed only one time to obtain a track pad 110 with a uniformly deep hardened region 302, as described above. Additionally, or alternatively, the surface hardening process (e.g., induction hardening process) may be performed using a single set of process parameters (e.g., the process parameters, as described above, are not changed during the surface hardening process or across multiple repetitions of the surface hardening process) to obtain a track pad 110 with a uniformly deep hardened region 302, as described above. In some implementations, if the thermal transfer regulation elements 310 and 320 are affixed, such as by welding, to track pad 110 when positioning the thermal transfer regulation elements 310 and 320, the thermal transfer regulation element(s) 310 and/or 320 may be left on track pad 110 after completion of process 400. Thus, track pad 110 may include at least one thermal transfer regulation element disposed on leading side 208a or trailing side 208b.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed track pad 110 may be used with any machine 100 that uses a tracked undercarriage. Track pad 110 may have various wear surfaces, such as a roller path surface 210 that engages with a set of rollers 118 of machine 100. Typically, a roller engaging surface may be surface-hardened to reduce wear, but a depth of the surface hardening may be non-uniform. For example, the hardening may be shallower at a leading side and a trailing side of the roller engaging surface due to convective heat loss at the edges of the roller engaging surface. This may result in increased wear where the hardening is shallower, thereby reducing useful life of the component. The disclosed track pad 110 may include a roller path member 208 having a hardened region 302 (e.g., that is harder than a body region 304) that is uniform in depth, as described above. For example, hardened region 302 may include a first edge portion at a leading side 208a of roller path member 208, a second edge portion at a trailing side 208b of roller path member, and a middle portion between the first edge portion and the second edge portion. The first edge portion and the second edge portion of hardened region 302 have a same depth as the middle portion of hardened region 302. In this way, track pad 110 may have improved wear resistance and a relatively longer useful life.

Track pad 110 may be obtained by a surface hardening process in which thermal transfer regulation elements 310 and 320 are positioned at leading side 208a and trailing side 208b of roller path member 208 of track pad 110. The thermal transfer regulation elements 310 and 320 may be composed of an insulating or conductive material to provide a heat shielding. Thus, in either case, during the surface hardening process (e.g., induction hardening), the thermal transfer regulation elements 310 and 320 may reduce or eliminate convective heat loss from leading side 208a and trailing side 208b. Accordingly, during the surface hardening process, a thermal profile at edge portions of roller path member 208 may be the same as a thermal profile at the middle portion of roller path member 208. In this way, heat treatment by the surface hardening process is provided uniformly in roller path member 208, thereby producing a hardened region that extends uniformly in depth from a roller path surface 210 of roller path member 208.

Moreover, the improved thermal regulation of the surface hardening process may enable simplification of the surface hardening process. For example, the surface hardening process may be performed using less passes, using a single set of process parameters, or the like. In this way, track pad 110 may be manufactured with increased speed, using less energy, or the like.

The foregoing disclosure provides illustration and description, but is not intended to be exhaustive or to limit the implementations to the precise form disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A track pad, comprising:
   a base member;
   drive lug members that extend from the base member; and
   a roller path member extending from the base member,
   the roller path member including a roller path surface for engaging with a roller of a machine,
   the roller path surface being between the drive lug members,
   the roller path member including a leading side and a trailing side in a direction of travel of the machine, and
   the roller path member including a hardened region that extends from the roller path surface and a body region adjacent the hardened region,
   wherein the hardened region has a greater hardness than the body region,
   wherein the hardened region has a uniform depth from the leading side to the trailing side, and
   wherein a thermal transfer regulation element is disposed on the leading side.

2. The track pad of claim 1, wherein the uniform depth is at least 27 millimeters from the roller path surface.

3. The track pad of claim 1, wherein the uniform depth is measured along a center line of the roller path member from the leading side to the trailing side.

4. The track pad of claim 1, wherein the hardened region has a hardness of at least 50 Rockwell C and the body region has a hardness of at most 35 Rockwell C.

5. The track pad of claim 1, wherein the track pad comprises a carbon steel.

6. The track pad of claim 1, wherein the hardened region includes a first edge portion at the leading side, a second edge portion at the trailing side, and a middle portion between the first edge portion and the second edge portion, and
   wherein the first edge portion and the second edge portion of the hardened region have a same depth as the middle portion of the hardened region.

7. The track pad of claim 1, further comprising:
   a different thermal transfer regulation element disposed on the trailing side.

8. The track pad of claim 1, wherein the thermal transfer regulation element remains disposed on the leading side after completion of a surface hardening process.

9. The track pad of claim 1, further comprising:
   a first thermal transfer regulation element disposed on the leading side, and
   a second thermal transfer regulation element disposed on the leading side,
   wherein the thermal transfer regulation element is the first thermal transfer regulation element, and
   wherein the first thermal transfer regulation element and the second thermal transfer regulation element are connected.

10. The track pad of claim 1, further comprising:
    a first thermal transfer regulation element disposed on the leading side, and
    a second thermal transfer regulation element disposed on the leading side,
    wherein the thermal transfer regulation element is the first thermal transfer regulation element, and
    wherein the first thermal transfer regulation element and the second thermal transfer regulation element comprise a thermal insulating material having a thermal resistance from 0.6 to 1.5 kelvin square-meter per watt.

11. The track pad of claim 1, further comprising:
    a first thermal transfer regulation element disposed on the leading side, and
    a second thermal transfer regulation element disposed on the leading side,
    wherein the thermal transfer regulation element is the first thermal transfer regulation element, and
    wherein the first thermal transfer regulation element and the second thermal transfer regulation element comprise a thermal conducting material having a thermal conductivity from 200 to 400 watts per meter-kelvin.

12. The track pad of claim 1, further comprising:
    a first thermal transfer regulation element disposed on the leading side, and
    a second thermal transfer regulation element disposed on the leading side,
    wherein the thermal transfer regulation element is the first thermal transfer regulation element, and
    wherein the first thermal transfer regulation element and the second thermal transfer regulation element comprise copper or polytetrafluoroethylene.

13. The track pad of claim 1, further comprising:
    a first thermal transfer regulation element disposed on the leading side, and
    a second thermal transfer regulation element disposed on the leading side,
    wherein the thermal transfer regulation element is the first thermal transfer regulation element,
    wherein the first thermal transfer regulation element and the second thermal transfer regulation element comprise a first metal or metal alloy, and
    wherein the track pad comprises a second metal or metal alloy different from the first metal or metal alloy.

14. The track pad of claim 1, wherein the roller path surface is a concave surface defined between the drive lug members.

15. A machine, comprising:
    a drive wheel;
    one or more idler wheels;
    at least one roller; and
    a track that includes a plurality of track pads connected end-to-end via pins,
    wherein the track wraps around the drive wheel, the one or more idler wheels, and the at least one roller,
    wherein the plurality of track pads comprise a track pad, and
    wherein the track pad comprises:
    a base member,
    drive lug members that extend from the base member, and
    a roller path member extending from the base member,
    wherein the roller path member includes a roller path surface configured to engage with the at least one roller,
    wherein the roller path surface is between the drive lug members,
    wherein the roller path member includes a hardened region that extends from the roller path surface and a body region adjacent the hardened region, wherein a first hardness of the hardened region is greater than a second hardness of the body region, wherein the roller path member includes a leading side and a trailing side, and wherein a thermal transfer regulation element is affixed to the leading side or the trailing side in a manner where the thermal transfer regulation element remains affixed after completion of a surface hardening process.

16. The machine of claim 15, wherein the drive lug members are configured to guide the track between the drive lug members and into contact with the roller path surface.

17. The machine of claim 15, wherein the hardened region is a surface region of the roller path member extending from the roller path surface, and wherein the body region is a remaining portion of the roller path member.

18. The machine of claim 15, wherein the first hardness of the hardened region is 40% to 70% greater than the second hardness of the body region.

19. A track, comprising:

a plurality of track pads that include a track pad, wherein the track pad includes:

a base member, drive lug members that extend from the base member, and a roller path member extending from the base member, wherein the roller path member includes a roller path surface, wherein the roller path surface is between the drive lug members, wherein the roller path member includes a hardened region that extends from the roller path surface and a body region adjacent the hardened region, wherein a first hardness of the hardened region is greater than a second hardness of the body region, wherein the roller path member includes a leading side and a trailing side, and wherein a thermal transfer regulation element is disposed on the leading side.

20. The track of claim 19, wherein the track pad further includes:

a first thermal transfer regulation element disposed on the leading side, and a second thermal transfer regulation element disposed on the leading side, wherein the thermal transfer regulation element is the first thermal transfer regulation element.

\* \* \* \* \*